(12) United States Patent
DiGiovanni et al.

(10) Patent No.: US 6,504,973 B1
(45) Date of Patent: Jan. 7, 2003

(54) RAMAN AMPLIFIED DISPERSION COMPENSATING MODULES

(75) Inventors: David J. DiGiovanni, Montclair, NJ (US); William Alfred Reed, Summit, NJ (US); Jeffrey W. Nicholson, Chatham, NJ (US); Man Fei Yan, Berkeley Heights, NJ (US); Bera Palsdottir, Copenhagen (DK)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/099,820

(22) Filed: Mar. 16, 2002

(51) Int. Cl.[7] ............... G02B 6/26; G02B 6/02; H04B 10/00; H01S 3/00
(52) U.S. Cl. ............... 385/27; 385/123; 359/160; 359/334; 372/6
(58) Field of Search ............... 385/27, 123, 124; 372/6, 3, 94; 359/341, 124, 160, 161, 173, 334, 341.32, 337.1, 337.11, 337.12, 337.2, 337.21, 337.22, 341.41, 341.43, 341.44, 341.45, 346

(56) References Cited

U.S. PATENT DOCUMENTS

| | | | | |
|---|---|---|---|---|
| 4,616,898 A | * | 10/1986 | Hicks, Jr. | 359/124 |
| 4,685,107 A | * | 8/1987 | Kafka et al. | 372/20 |
| 4,740,974 A | * | 4/1988 | Byron | 359/334 |
| 5,361,319 A | * | 11/1994 | Antos et al. | 385/123 |
| 5,696,614 A | * | 12/1997 | Ishikawa et al. | 359/124 |
| 5,887,093 A | * | 3/1999 | Hansen et al. | 359/160 |
| 6,335,820 B1 | * | 1/2002 | Islam | 359/334 |

OTHER PUBLICATIONS

H. Kidorf et al, Pump Interactions in a 100–nm Bandwidth Raman Amplifier, IEEE Photonics Tech. Letters, v. 11 (May 1999) at 530–532.

S.A.E. Lewis et al, Broadband high–gain dispersion compensating Raman amplifier, Electronics Letters, Aug. 3, 2000, at 1355–56.

* cited by examiner

Primary Examiner—Akm E. Ullah
(74) Attorney, Agent, or Firm—Law Office of Leo Zucker

(57) ABSTRACT

A Raman amplified dispersion compensation module has a first dispersion compensating fiber (DCF) with an input end and an output end. The first DCF has a known Raman gain coefficient ($g_r(\lambda)$), Raman effective fiber area ($A^R_{eff}$), and dispersion characteristic. An input end of a second DCF is arranged to receive light signals from the output end of the first DCF. The second DCF has a known gain coefficient and effective area, and a dispersion characteristic selected to cooperate with that of the first DCF to produce a desired total module dispersion. The lengths of the DCFs are selected in a manner that optimizes the overall module gain.

13 Claims, 8 Drawing Sheets

RAMAN AMPLIFIED DISPERSION COMPENSATING MODULES

BACKGROUND OF THE INVENTION

1. Field of the Invention

The present invention relates to modules that compensate for chromatic dispersion of light signals when transmitted through an optical fiber.

2. Discussion of the Known Art

Dispersion compensating modules (DCMs) including one or more lengths of dispersion compensating fibers (DCFs), are generally known as a means for compensating for chromatic dispersion of light signals when transmitted through a fiber of a fiber optic communication system. DCMs thus enable existing systems to handle signals with bandwidths and wavelengths for which the systems were not originally designed, and without the need for replacing long spans of installed fiber optic cable with newer, higher rated cables. As transmission bandwidth requirements increase, the range of wavelengths over which a DCM must provide effective dispersion compensation will therefore increase accordingly.

The use of more than one type of fiber in a DCM has certain advantages, including tighter manufacturing tolerances and simultaneous control of dispersion, dispersion slope, and even higher order dispersion over a broad bandwidth (50 nm or more). Because DCMs may themselves use several kilometers of fiber having a certain signal attenuation factor, it is useful to combine the functions of dispersion compensation and Raman amplification into a single, Raman amplified, dispersion compensating module or "RADCM".

As signal transmission wavelengths approach regions that cannot be handled by known rare-earth doped amplifiers, or as the transmission bandwidth exceeds that of current erbium-doped optical amplifiers, the need for a discrete amplifier with broadband gain becomes critical. Discrete Raman amplifiers have an advantage in that (a) they may operate in any wavelength range depending only on a supplied pump wavelength, and (b) they can achieve a broad gain-bandwidth product by using multiple pumps at several wavelengths.

Existing DCMs having excellent dispersion properties are not always capable of being modified into efficient RADCMs, however. For example, a given DCM may provide good dispersion compensation but not be able to provide enough gain for the available Raman pump power. Also, fibers used in the DCM for dispersion compensation may be too long and cause noise due to multi-pass interference (MPI), or the fibers used in the DCM for dispersion compensation may have too small an effective area and cause undesired four-wave mixing (FWM).

As mentioned, the concept of Raman pumping a single fiber DCM to compensate for signal loss is generally known. See, e.g., U.S. Pat. No. 5,887,093 (Mar. 23, 1999) all relevant portions of which are incorporated by reference. In an article by S. A. E. Lewis, et al., in 36 Elec. Lett. (2000) at page 1355, a broadband RADCM is described with two fibers whose lengths are carefully chosen together with the amount of pump power supplied to each fiber. To maintain a low noise figure, the fiber which provides the bulk of dispersion compensation is given relatively little pump power and contributes less than 25% of the gain. Notwithstanding, the predominantly compensating fiber contributes more than half of the noise. In addition, a complicated mid-span pump arrangement with multiple circulators is required. Thus, while Lewis, et al. demonstrate that Raman gain and dispersion compensation may be achieved independently, the article does not show that desired dispersion compensation and Raman gain can be achieved simultaneously, or that the DCF may achieve either wideband or slope and curvature compensation.

A multi-stage amplifier with the option of using DCFs is described in U.S. Pat No. 6,335,820 (Jan. 1, 2002), all relevant portions of which are incorporated by reference. Low noise operation was achieved by the use of a mid span lossy element such as an optical isolator, and a mid-span pumping configuration, however.

In view of the known art, there remains a need for a RADCM that provides sufficient gain, dispersion, and dispersion slope compensation with low noise due to DRS, MPI and FWM, and without the need for any complex mid-span pumping schemes or loss elements.

SUMMARY OF THE INVENTION

According to the invention, a dispersion compensation module of the kind having at least two dispersion compensating fibers to compensate for chromatic dispersion produced in light signals conducted through a transmission fiber, includes a first dispersion compensating fiber (DCF) having a first length, an input end and an output end, and the first DCF has a first Raman gain coefficient ($g_R(\lambda)$), a first Raman effective fiber area ($A^r_{eff}$), and a first dispersion characteristic. The module also has a second DCF having a second length, an input end and an output end, wherein the input end of the second DCF is arranged to receive light signals from the output end of the first DCF and in the absence of a pump signal source between the input end of the second DCF and the output end of the first DCF. The second DCF has a second Raman gain coefficient, a second Raman effective fiber area, and a second dispersion characteristic selected to cooperate with the first dispersion characteristic to produce a desired module dispersion that compensates for chromatic dispersion produced in the light signals when conducted through the transmission fiber and applied to the input end of the first DCF.

A pump light source is coupled to either the output end of the second DCF or to the input end of the first DCF. The pump light source has a certain power level at one or more wavelengths to produce a desired module gain with a determined bandwidth for amplifying the light signals, and the lengths of the first and the second DCFs are selected in a manner that optimizes the module gain while maintaining the desired total module dispersion.

For a better understanding of the invention, reference is made to the following description taken in conjunction with the accompanying drawing and the appended claims.

DETAILED DESCRIPTION OF THE INVENTION

Figure 1:
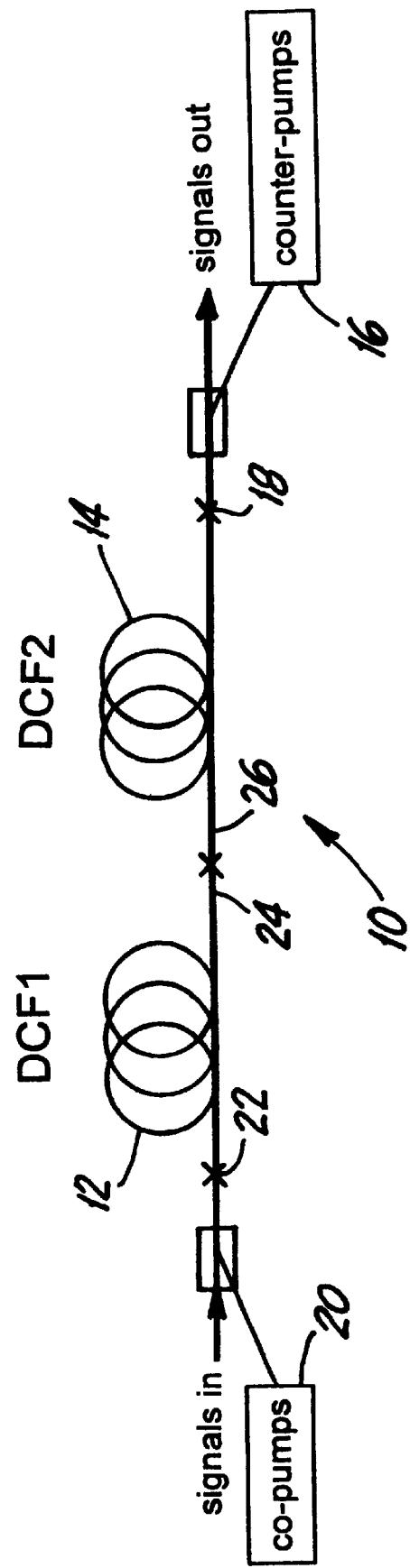
FIG. 1 is a schematic of a first embodiment of a RADCM according to the invention.

In RADCMs constructed according to the invention, two or more dispersion compensating fibers (DCFs) are combined to obtain simultaneous control of dispersion, relative dispersion slope (RDS) and higher order dispersion. While multiple fibers each having different dispersion characteristics may be combined in a theoretically infinite number of length combinations to achieve a desired total module dispersion for a given signal wavelength range, the Raman gain and noise characteristics of the module may be optimized by applying one or more of the following criteria:

1. The lengths of the DCFs in the module are chosen to maximize overall module gain while simultaneously maintaining a target dispersion.

2. Reflectors, such as Fiber Bragg Gratings (FBG), may be used to re-inject unabsorbed pump light at the signal input end of the RADCM to increase pump utilization while lowering noise due to double Rayleigh scatter, without significant insertion loss at the input signal wavelengths.

3. The lengths of one or more DCFs may be selected to introduce a dispersion greater than 50 ps/nm-km in magnitude, and at least one DCF may introduce a dispersion less than 20 ps/nm-km in magnitude with $A_{eff}$<20 $\mu m^2$ (hereafter, a highly nonlinear fiber or "HNLF"). The HNLF possesses a high Raman gain coefficient, low dispersion, and low dispersion slope and curvature. The low slope and curvature of the HNLF enables the dispersion of the overall module to remain unaffected by slight alterations of the lengths of the other DCFS, and significantly increases the overall module gain.

4. While fiber order may not be important with respect to overall dispersion compensation provided by a RADCM, parameters including fiber loss, Raman gain, and Rayleigh scattering should be considered to optimize the fiber order for maximum Raman gain while simultaneously minimizing noise due to double Rayleigh scatter, MPI and FWM.

In RADCMs having multiple co- and/or counter-propagating pump and signal wavelengths, and different lengths of fibers each possessing a different gain coefficient, loss and Rayleigh scattering coefficient, the overall module gain and noise properties may be determined by solving the following coupled differential equation for each fiber, which accounts for Raman interactions between the different wavelength signals:

$$\frac{dP_f(z, v)}{dz} = -\alpha(v)P_f(z, v) + \gamma(v)P_b(z, v) +$$ (Eq. 1)

-continued $$\int_{\zeta>v} \left\{ \frac{g_r}{A_{eff}} (v - \zeta)[P_f(z, \zeta) + P_b(z, \zeta)]P_f(z, v) + \right.$$

$$2hv \frac{g_r}{A_{eff}} (v - \zeta)[P_f(z, \zeta) + P_b(z, \zeta)] \cdot$$

$$\left. \left[1 + \frac{1}{e^{h(\zeta-v)/kT} - 1}\right] \right\} d\zeta -$$

$$\int_{\zeta<v} \left\{ \frac{g_r}{A_{eff}} (v - \zeta)[P_f(z, \zeta) + P_b(z, \zeta)]P_f(z, v) + \right.$$

$$2hv \frac{g_r}{A_{eff}} (v - \zeta)[P_f(z, \zeta) + P_b(z, \zeta)] \cdot$$

$$\left. \left[1 + \frac{1}{e^{h(v-\zeta)/kT} - 1}\right] \right\} d\zeta.$$

In Eq. 1, $n_f(z, v)$ forward power at frequency v at distance z;

$n_v(z, v)$ backward power at frequency v at distance z;

$\alpha(v)$ attenuation;

$\gamma(v)$ Rayleigh scattering coefficient, $g_r(\Delta v)g_r(\zeta-v)$ Raman gain coefficient between frequencies $\zeta$ and v;

$A_{eff}$ effective area of the fiber;

h Planck's constant;

k Boltzman's constant;

T temperature of the fiber.

The above equation (Eq. 1) is preferably solved numerically to optimize the module performance when applied in a given communication system. Certain trends may be understood, however, for the case of a single pump and a single weak signal. In the small signal regime, the different parts of the equation may be more readily solved analytically. Thus, signal power at the output of the module, $P_{out}$, for a fiber length L, is related to the signal power at the input of the amplifier, $P_{in}$, by the equation:

$$P_{out} = P_{in} \exp\left[\frac{g_R(\lambda)}{A_{eff}^R} P_p L_{eff} - \alpha_s L\right],$$ (Eq. 2)

where $g_r(\lambda)$ is the Raman gain coefficient, $A^R_{eff}$ is the Raman effective area of the fiber, $P_P$ is the input pump power in the DCF, and $\alpha_s$ is the loss at the signal wavelength. $L_{eff}$ is the effective length of the fiber at the pump wavelength:

$$L_{eff} = \frac{1}{\alpha_p}(1 - e^{-\alpha_p L}),$$ (Eq. 3)

where $\alpha_P$ is the loss at the pump wavelength.

To maximize the module gain, a length of fiber whose properties maximize the exponent in Eq. 2 should experience the highest pump powers. For example, for a module having two fibers with similar loss coefficients for the two fiber lengths, the longest length possible for the fiber that has the highest ratio $g_R/A^R_{eff}$ should be selected while maintaining the desired dispersion properties. Since the pump power is attenuated by fiber loss and splice loss, the fiber having the higher gain should be placed on the pump input side of the module.

Noise Considerations

In the case of high gain, low dispersion fibers such as the HNLF, the influence of noise may modify fiber placement due to gain arguments. To optimize module gain while minimizing double Rayleigh scatter MPI, the amount of gain provided by the HNLF which has a high Raman gain coefficient and a low ratio of Rayleigh scattering to Raman gain, should be maximized. This in effect separates the functions of the HNLF, which becomes primarily a gain block, from that of one or more other DCFs that provide the bulk of dispersion compensation in the module. Although for maximum gain, the high gain HNLF part of the module should experience the highest pump power, the low dispersion of the HNLF causes the penalty due to FWM to increase with the amount of gain provided by the HNLF. And such impairment is greatest when the HNLF provides the largest fraction of gain in the overall module. Accordingly, for RADCMs having low noise due to MPI and FWM, a practical compromise must be reached between the amount of gain provided by the HNLF, and the amount of FWM.

Counter-pumped RADCMs were constructed with the HNLF at the middle or at the signal input end, wherein the HNLF typically provided less then 3 dB out of more than 8 dB net gain. These modules showed low (−43 dB) impairment due to DRS, and FWM penalties low enough for operation at 40 Gb/s. Therefore, while placing the HNLF in the middle (or at the signal input end in a counter-pumped module) does not provide the maximum possible gain, such a configuration does allow for increased gain without significant impairment due to DRS and FWM.

FIG. 1 represents a two-fiber RADCM 10 that was constructed according to the invention. The RADCM 10 has two dispersion compensating fibers (DCFs) 12, 14. One or more counter-pumps 16 supply pump power at one or more wavelengths to a signal output end 18 of the DCF 14. One or more co-pumps 20 may also supply pump power at one or more wavelengths to a signal input end 22 of the DCF 12. The pump wavelengths are chosen appropriately to broaden the gain-bandwidth of the module 10.

Optimization of gain of RADCM 10 by optimizing the lengths of DCFs 12, 14

Figure 2:
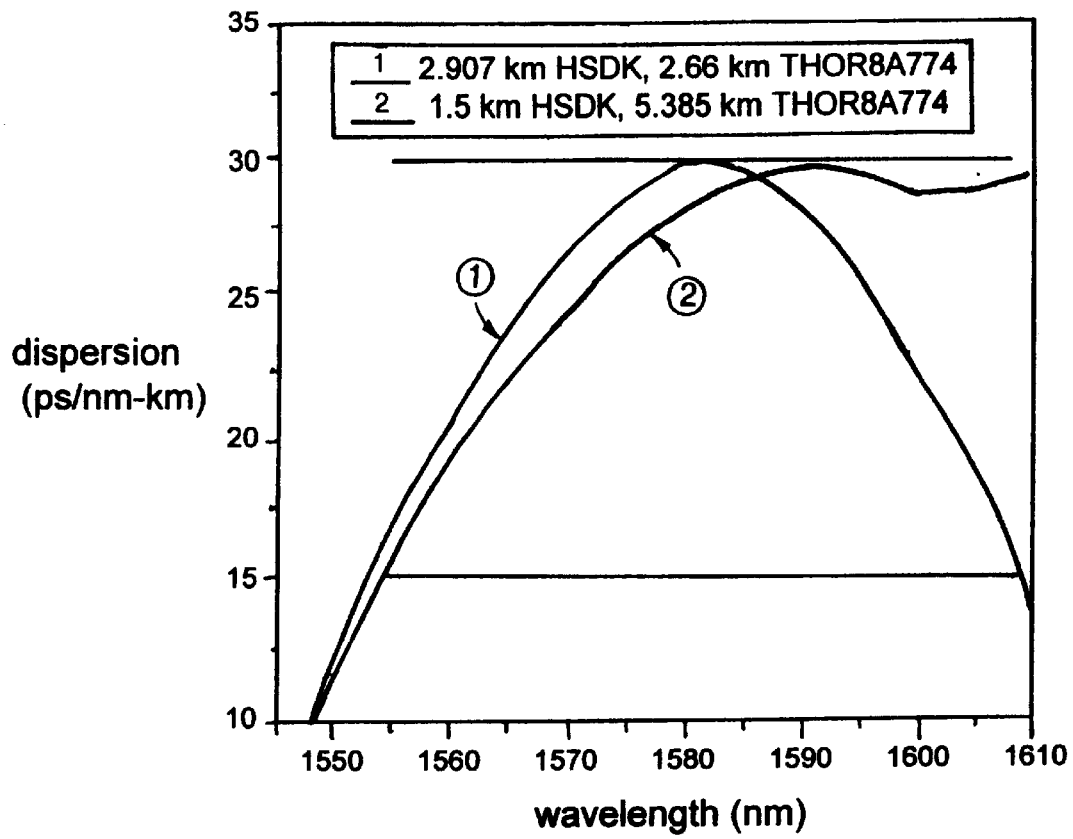
FIG. 2 is a graph showing residual dispersions of two RADCMs using DCFs of different lengths.
Figure 3:
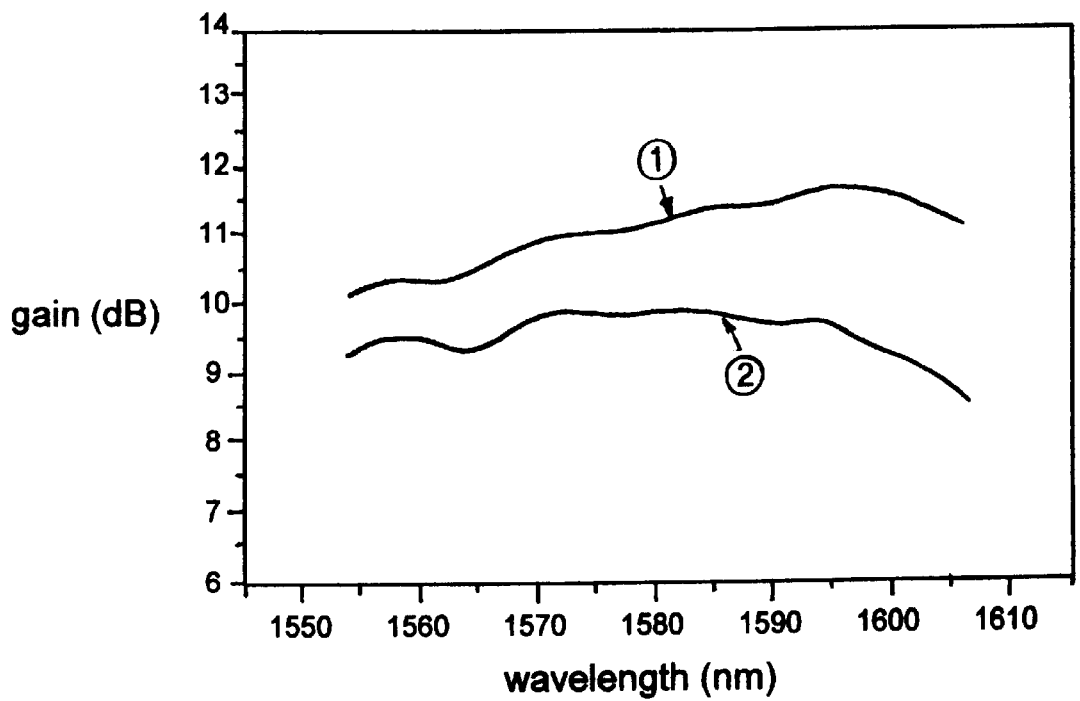
FIG. 3 is a graph showing gain of the two RADCMs in FIG. 2.

FIG. 2 shows residual dispersion (the difference between maximum and minimum dispersion over the wavelength range of operation) when two RADCMs constructed per FIG. 1 but using different lengths for each of the DCFs 12, 14 are combined with 100 km of TWRS. Both of the RADCMs used HSDK and THOR8A774 for the fibers 12, 14. One module used 2.907 km HSDK and 2.66 km THOR8A774 (curve 1), and the other module used 1.5 km HSDK and 5.385 km THOR8A774 (curve 2). The residual dispersion window (FIG. 2) for the two modules is the same. As shown in FIG. 3, however, the gains of the two modules differ significantly. The module that used 2.9 km HSDK had as much as 3 dB more gain for a given amount of pump power than the other module.

Optimization of gain of RADCM 10 by optimizing the order of DCFs 12, 14

In RADCMs using two or more types of DCFs, the overall dispersion does not depend on the order in which the fibers are configured in the module. The module gain does, however, depend on the placement of a given DCF in relation to pump and input signals since pump power is attenuated as it propagates through the fibers. Higher gain is thus achieved by directing the highest pump power in the fiber having the highest gain efficiency.

Figure 4:
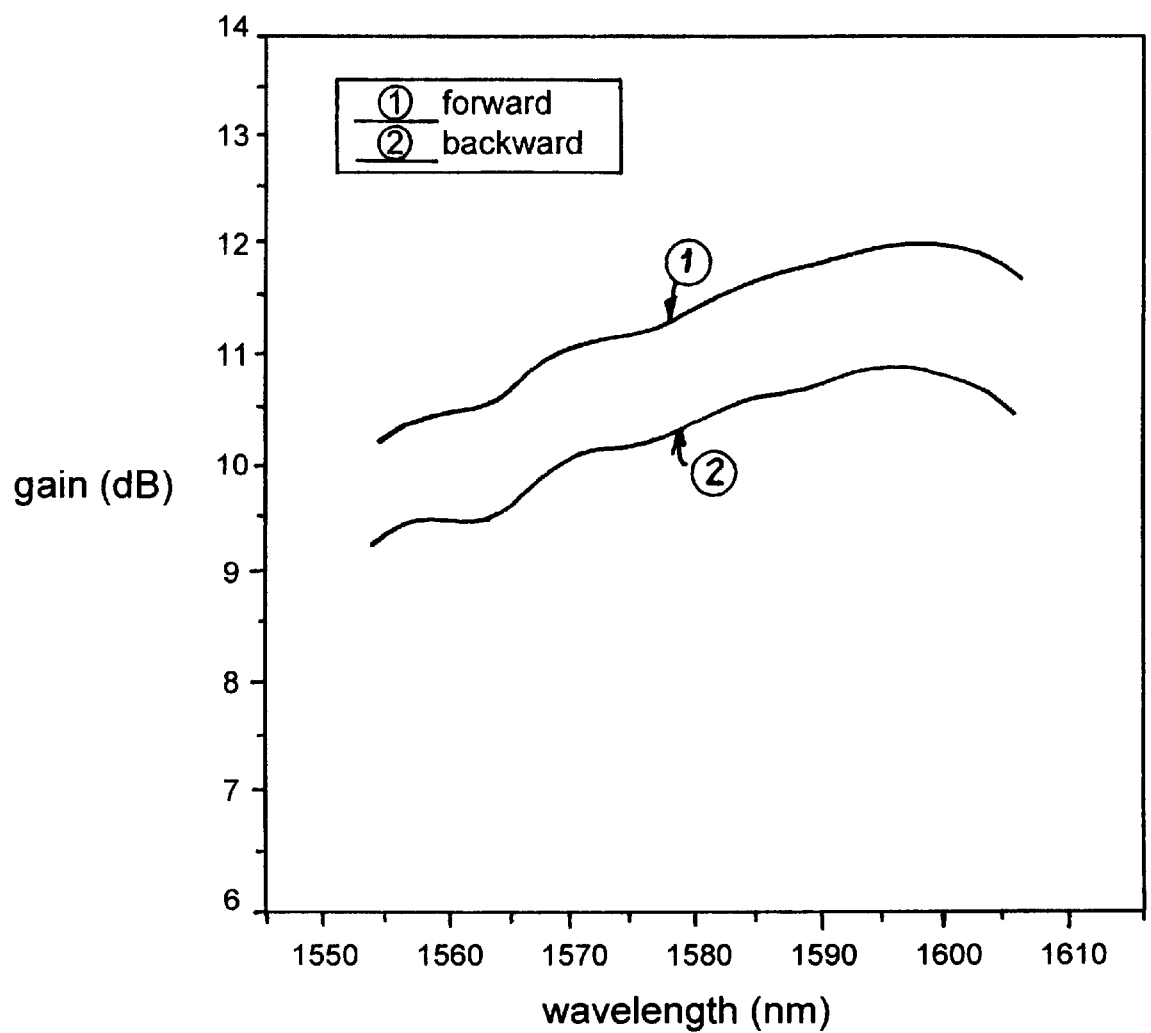
FIG. 4 is a graph showing gain for a RADCM in which the order of the DCFs is interchanged.

FIG. 4 shows the gain of a RADCM 10 having 2.907 km of HSDK and 2.660 km of THOR8A774. Curve 1 shows the calculated gain when the HSDK fiber is placed near on the pump side of the RADCM, and curve 2 shows the gain when the HSDK fiber is placed on the signal side of the module. The gain is significantly higher (by over 1.5 dB) when the HSDK fiber, which has a higher Raman gain coefficient than the THOR8A774 fiber, is placed on the pump side of the RADCM.

Use of a HNLF fiber in RADCM 10

One of the DCFs 12, 14 in the RADCM 10 in FIG. 1 may have a dispersion greater than 50 ps/nm-km in magnitude, and the other DCF have a dispersion less than 20 ps/nm-km in magnitude but with higher gain efficiency. In such case, the latter fiber which is referred to herein as a highly nonlinear fiber or HNLF, does not provide appreciable dispersion compensation for the module 10 and is used to augment the gain of the first mentioned fiber.

Ideally, a HNLF has a relative dispersion slope (RDS) less than half that of a typical dispersion compensating fiber. Even more important, the relative dispersion curvature (RDC) of a HNLF should be smaller than that of a typical DCF.

Figure 5:
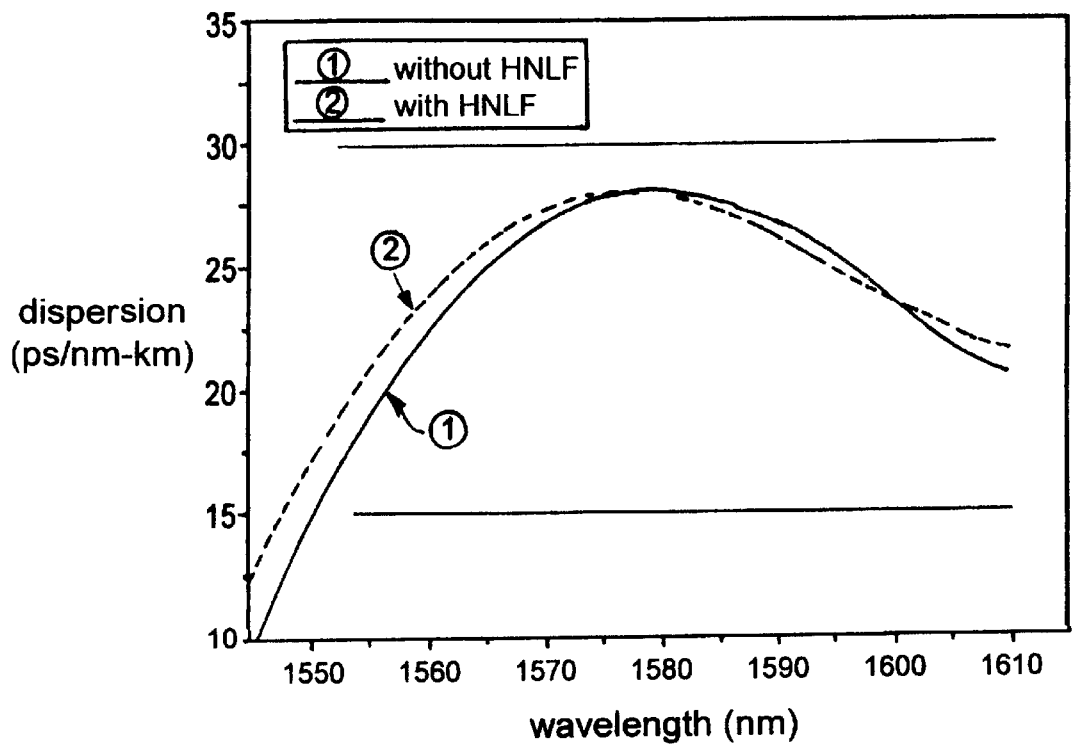
FIG. 5 is a graph showing residual dispersion for a RADCM with and without a HNLF fiber.
Figure 6:
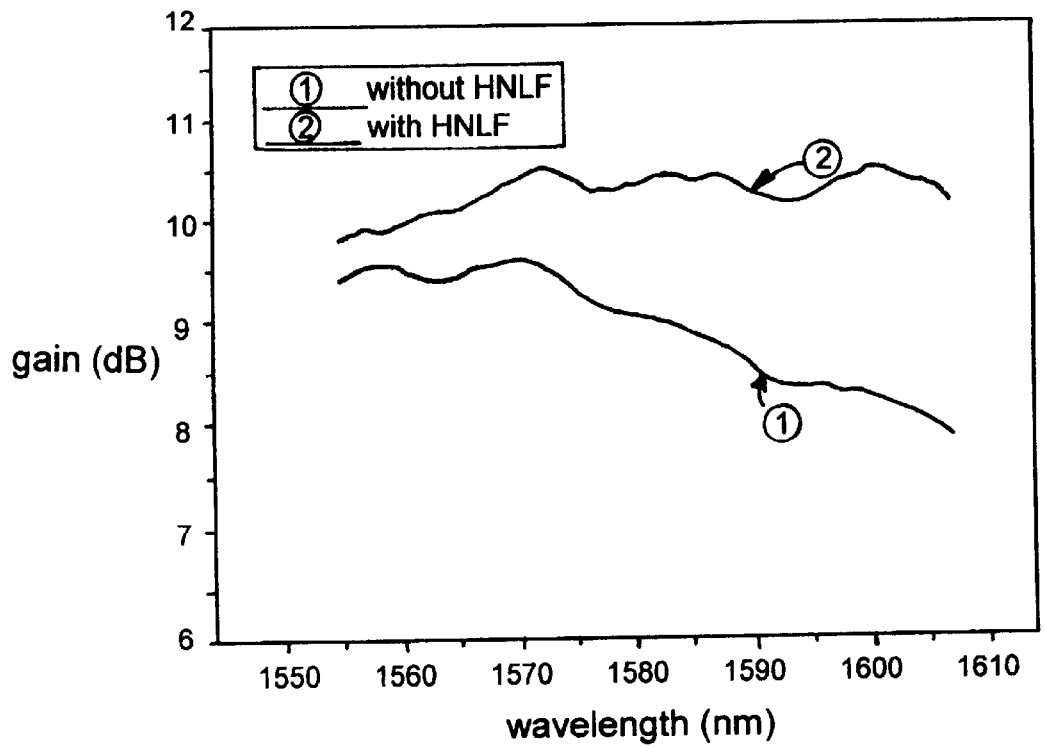
FIG. 6 is a graph showing gain for the RADCM in FIG. 5.

FIG. 5 shows the dispersion and gain of a RADCM with and without a HNLF having the properties of D=−4.9 ps/nm-km, D'=0.017 ps/nm$^2$-km, D"=−8.9* $10^{-5}$ ps/nm$^3$-km. The RADCM without the HNLF used 3.3 km of HSDK and 2.18 km of THOR8A774. The module that used HNLF included 2.62 km HSDK, 3.1 km THOR8A774, and 3.0 km HNLF. Because of the low RDS of the HNLF, the dispersion for the two modules as shown in FIG. 5 is nearly identical. But including the HNLF in the module significantly increased the gain as shown in FIG. 6. The order of fibers in the RADCM was THO8A774 on the signal input side of the module, HNLF in the middle, and HSDK on the pump side of the module. Although the mentioned ordering did not provide highest gain, it is more beneficial from a noise standpoint as discussed above. The ordering allowed for a low DRS coefficient (Rc) of −43 dB, as well as a low penalty due to FWM.

Pump Reflection

Figure 7:
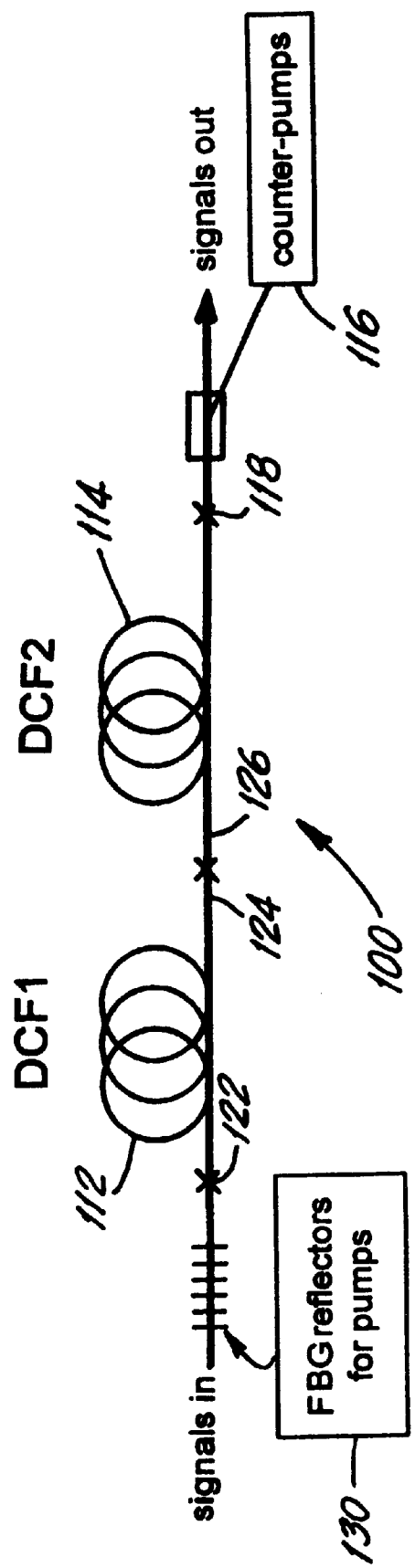
FIG. 7 is a schematic of a RADCM according to a second embodiment of the invention.

FIG. 7 shows a RADCM 100 according to another embodiment of the invention. Components the same or similar to the RADCM 10 in FIG. 1 have corresponding reference numerals increased by 100. The RADCM 100 includes two or more dispersion compensating fibers 112, 114 with a pump reflector(s) in the form of a fiber Bragg grating 130 for efficient utilization of unabsorbed pump energy. Since the lengths of the DCFs 112, 114 are typically less than 10 km, significant pump power would exit the module if not reflected back by the grating 130 to improve both the gain and efficiency of the module.

Optimization of Gain Using Pump Reflectors

Pump reflectors such as the grating 130 in FIG. 7 may be used at the signal input end 122 of the module 100 to increase utilization of pump energy. Such an arrangement increases the module gain and lowers the penalty due to double Rayleigh scatter. Because the pump(s) 116 operates at a shorter wavelength than the light signals input to the module, the pump reflectors can be configured to introduce minimal loss (e.g., 0.1 to 0.2 dB) at the input signal wavelength. Because some fraction of the pump co-propagates with the signals, lasers for the pump 116 must be chosen so that their RIN noise falls outside the frequency range of a system receiver to prevent impairment arising from pump-signal crosstalk.

Figure 8:
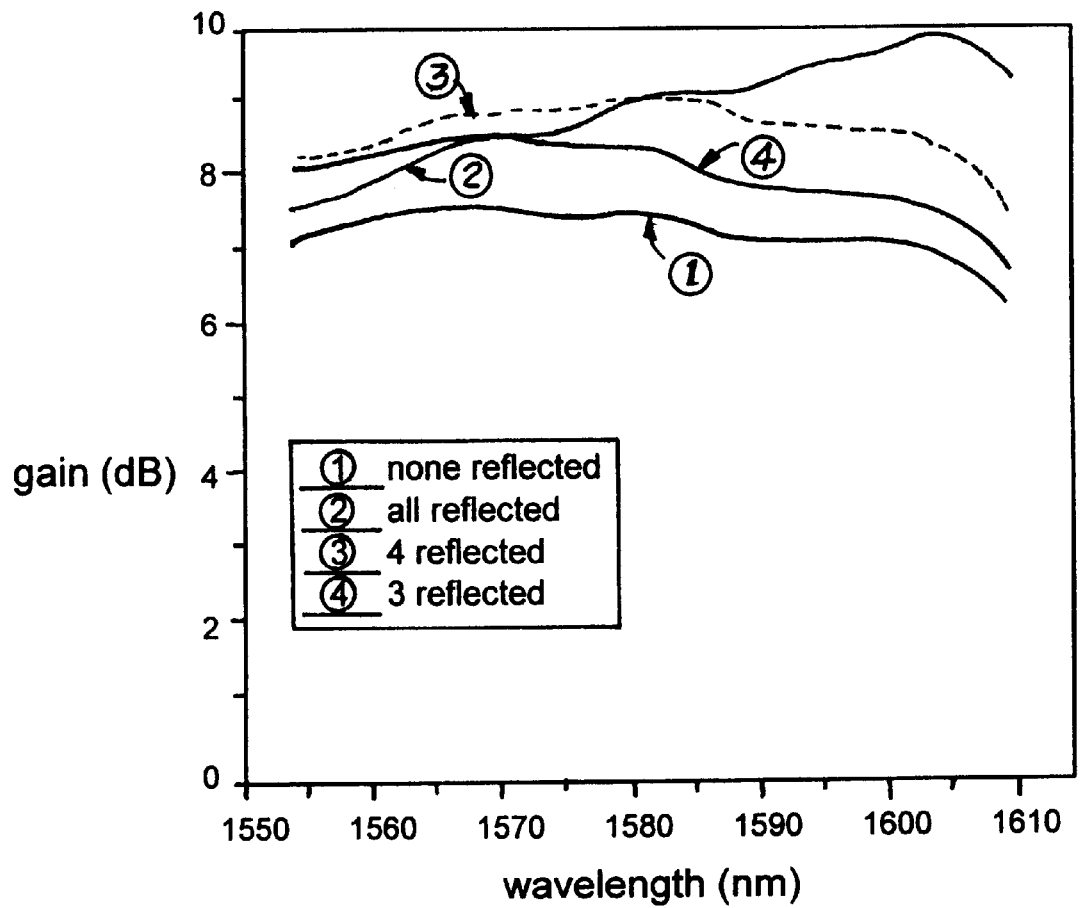
FIG. 8 is a graph showing gain as a function of a number of pumps reflected at an input end of the RADCM in FIG. 7.

FIG. 8 shows the effect on module gain for different numbers of pump wavelengths reflected at the signal input end 122 of the RADCM 100. The gain can be increased by over 3 dB for some wavelengths with all the pumps reflected. Reflecting all of the pump power is not necessarily beneficial, however, because pump to pump interactions can lead to significant gain tilt. The optimum number of pump s to be reflected depends on the total number of pump and signal wavelengths, and power, as well as individual properties of the DCFs 112, 114 such as loss and Raman gain.

Figure 9:
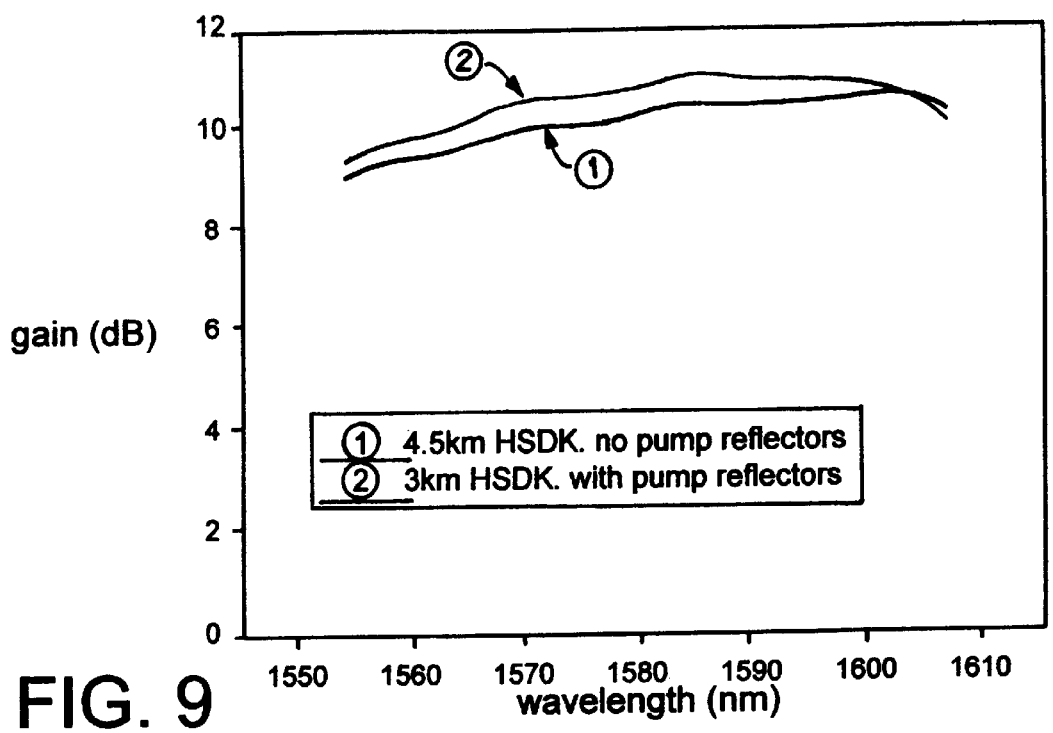
FIG. 9 is a graph showing gain of two RADCMs, one with and one without pump reflectors.
Figure 10:
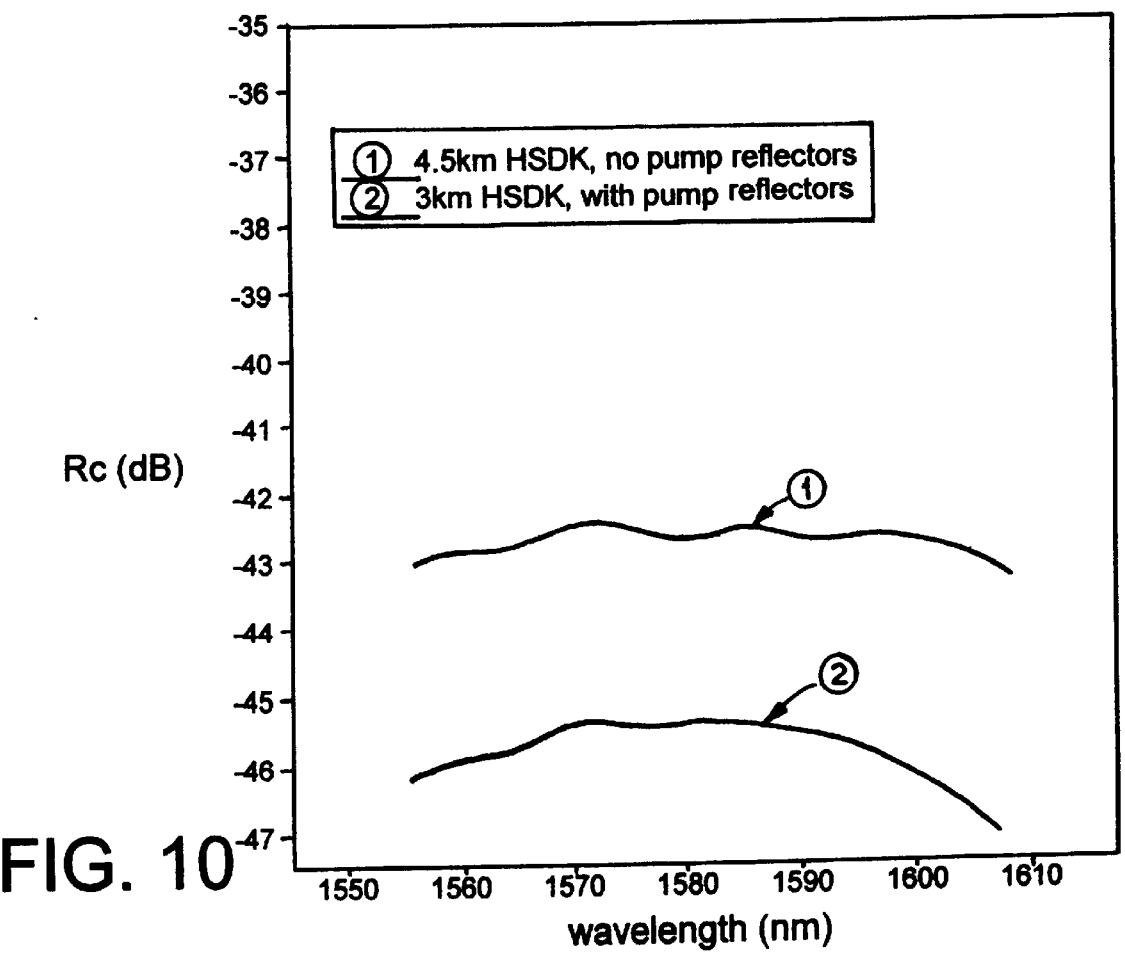
FIG. 10 is a graph showing double Rayleigh scatter for the two RADCMs in FIG. 9.

FIG. 9 shows the gain for two RADCMs, one with 4.5 km HSDK without pump reflectors, and the other with 3.0 km HSDK and having pump reflectors. Although the gain for the two modules is similar, FIG. 10 shows that the penalty due to double Rayleigh scatter is significantly lower for the module that makes use of the shorter length of HSDK fiber and FBG pump reflectors.

Figure 11:
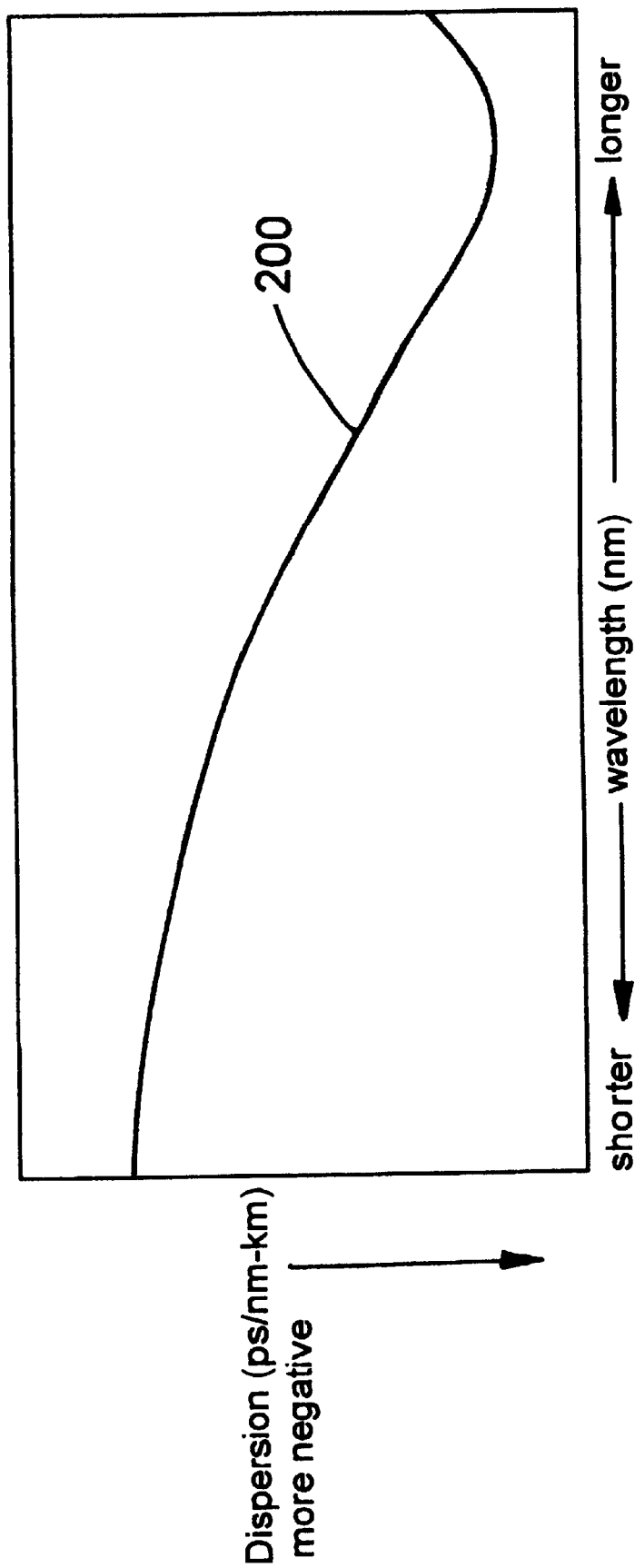
FIG. 11. is a graph showing dispersion of a DCF as a function of operating wavelength.

FIG. 11 is a graph showing a dispersion characteristic of a DCF as a function of wavelength. As shown in the figure, the characteristic exhibits an inflection point 200 at a certain wavelength wherein the rate of change of the slope (i.e., the second derivative) of the characteristic is substantially zero. According to the invention, it is preferred that one or more of the DCFs for the present module be selected such that their inflection points are at or near the operating wavelength range of the system transmission fiber. Such a selection of the DCFs would enable the present module to compensate for dispersion of the transmission fiber in an optimal manner.

While the foregoing description represents preferred embodiments of the invention, it will be obvious to those skilled in the art that various changes and modifications may be made without departing from the spirit and scope of the invention pointed out by the following claims.

We claim:

1. A Raman amplified dispersion compensation module (RADCM) of the kind having two or more dispersion compensation fibers (DCFs) which cooperate to compensate for chromatic dispersion produced in light signals conducted through a transmission fiber, comprising:

a first DCF having a first length, an input end and an output end, and the first DCF has a first Raman gain coefficient ($g_r(\lambda)$), a first Raman effective fiber area ($A^r_{eff}$), and a first dispersion characteristic;

a second DCF having a second length, an input end and an output end, wherein the input end of the second DCF is arranged to receive light signals from the output end of the first DCF in the absence of a pump signal source between the input end of the second DCF and the output end of the first DCF, and the second DCF has a second Raman gain coefficient, a second Raman effective fiber area, and a second dispersion characteristic selected to cooperate with the first dispersion characteristic so that compensated light signals will be provided at the output end of the second DCF; and a pump light source coupled to either the output end of the second DCF or to the input end of the first DCF, wherein the pump light source has a certain power level at one or more wavelengths for producing a desired module gain with a determined bandwidth for amplifying light signals to be compensated; and the lengths of the first and the second DCFs are selected so that the desired module gain is optimized.

2. A RADCM according to claim 1, wherein the pump light source is coupled to the output end of the second DCF, and including one or more pump reflectors arranged at the input end of the first DCF.

3. A RADCM according to claim 2, wherein one or more of the pump reflectors is a fiber Bragg grating.

4. A RADCM according to claim 1, including a third DCF having an input end arranged to receive light signals from the output end of the first DCF, and an output end arranged to provide the light signals received at the input end of the third DCF to the input end of the second DCF.

5. A RADCM according to claim 1, wherein one of the DCFs has a dispersion less than about 20 ps/nm-km, and an effective area less than about 20 $\mu m^2$.

6. A RADCM according to claim 5, wherein one of the DCFs has a dispersion greater than about 50 ps/nm-km.

7. A RADCM according to claim 1, wherein the DCFs are ordered with respect to one another to obtain greatest overall gain for the module.

8. A RADCM according to claim 7, wherein the length of the DCF that has a highest ratio of $g_r(\lambda)/A^r_{eff}$, is as great as possible while maintaining the desired total module dispersion.

9. A RADCM according to claim 1, wherein at least one of the DCFs has a dispersion characteristic with an inflection point at a wavelength that is within or near an operating bandwidth of a transmission fiber to be compensated by the module.

10. A RADCM according to claim 5, wherein the one DCF has a dispersion of less than 10 ps/nm-km, and at least one other DCF is arranged between the one DCF and the pump light source.

11. A RADCM according to claim 1, wherein the length (L) of the DCF having the highest value of $[(g_R(\lambda)/A^R_{eff})(P_P)(L_{eff})-(\alpha_s)(L)]$, is substantially as great as possible while maintaining the desired total module dispersion, wherein $g_R(\lambda)$ is the Raman gain coefficient of the DCF, $A^R_{eff}$ is the Raman effective area of the DCF, $P_P$ is pump power input to the DCF, $\alpha_s$ is the DCF loss at the transmission signal wavelength, and $L_{eff}$ is the effective length of the DCF at the wavelength of the pump light wherein $L_{eff}=(1/\alpha_P)(1-e^{-\alpha_P L})$ and $\alpha_P$ is the DCF loss at the pump light wavelength.

12. A RADCM according to claim 11, wherein the DCF having said highest value is arranged closest to the pump light source.

13. An optical fiber communication system comprising a transmitter for launching a light signal, a system transmission fiber for transmitting the light signal over a desired path, a receiver for receiving the light signal, and a RADCM according to claim 1 operatively coupled to the transmission fiber between the transmitter and the receiver to compensate for chromatic dispersion produced in the light signal by the transmission fiber.

* * * * *